3,371,090
NOVEL ANTIBACTERIAL AGENTS
James David Johnston, Old Saybrook, Conn., assignor to Chas. Pfizer & Co., Inc., New York, N.Y., a corporation of Delaware
No Drawing. Continuation-in-part of application Ser. No. 397,004, Sept. 16, 1964. This application July 9, 1965, Ser. No. 470,934
11 Claims. (Cl. 260—240)

ABSTRACT OF THE DISCLOSURE

Schiff bases derived from 2-formylquinoxaline-1,4-dioxides valuable in the control of urinary tract and systemic infections, chronic respiratory disease, infectious sinusitis in turkeys and promotion of growth of animals.

---

This application is a continuation-in-part of my earlier filed pending application Ser. No. 397,004, filed Sept. 16, 1964 and now abandoned.

This invention relates to a novel series of Schiff bases which are effective as urinary tract antiseptics, systemic anti-infectives, animal growth promotants and as agents for the control of chronic respiratory disease in poultry and improvement of feed efficiency in animals. More particularly, it relates to a series of Schiff bases derived from 2-formylquinoxaline-1,4-dioxides which are valuable for the control of urinary tract and systemic infections, chronic respiratory disease in poultry, infectious sinusitis in turkeys and promotion of growth of animals.

The novel compounds of this invention have the general formula

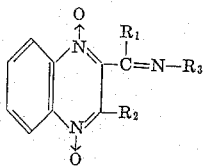

wherein each of $R_1$ and $R_2$ is individually selected from the group consisting of hydrogen and lower alkyl; $R_3$ is selected from the group consisting of

NH—CO—NH$_2$
NH—CS—NH$_2$
NH—C(NH)—NH$_2$
NHR$_4$
NHCOOR$_5$
NHCOR$_6$
OR$_7$

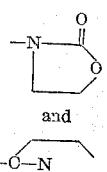

and wherein $R_4$ is selected from the group consisting of lower alkyl, phenyl, benzyl and hydroxyalkyl containing from 2 to 4 carbon atoms;

$R_5$ is selected from the group consisting of lower alkyl, hydroxyalkyl containing from 2 to 4 carbon atoms, and haloalkyl containing from 2 to 4 carbon atoms;

$R_6$ is selected from the group consisting of lower alkyl and phenyl; and $R_7$ is selected from the group consisting of hydrogen and lower alkyl.

The term "lower alkyl" as used herein includes the branched-chain as well as the straight-chain radicals of those lower alkyl groups having three or more carbon atoms.

The valuable compounds of this invention are readily prepared by methods well known in the art. The most convenient method from the standpoint of availability of materials, ease and simplicity of reaction, yield and purity of product, is the condensation of the appropriate 2-lower alkanoyl quinoxaline-1,4-dioxide with the proper amino derivative, H$_2$N—R$_3$, wherein R$_3$ is as defined above.

The process comprises, in general, the reaction of the 2-lower alkanoyl quinoxaline-1,4-dioxide and the amino derivative of choice in a suitable solvent system such as acetic acid, ether and lower alcohols, especially methyl and ethyl alcohols at a temperature of from about room temperature to the reflux temperature of the solvent. The addition of a small amount of an acid such as hydrochloric or acetic frequently serves to accelerate the reaction and improve the yield. The amino derivative can be used in the form of an acid addition salt, e.g., the hydrochloride, sulfate, acetate. In such a case an aqueous solution of the amine derivative to which the requisite amount of alkali, alkali bicarbonate or carbonate or an excess of alkali acetate is added is generally used. In many cases, as for example, when using semicarbazide, a concentrated aqueous solution of the semicarbazide hydrochloride is added to an alcohol or acetic acid solution of the aldehyde to give the desired semicarbazone. Potassium acetate is added to complete formation of the product. In still another modification the salt of the amino derivative, e.g., semicarbazide hydrochloride, is employed in methanol solution and added to the aldehyde to produce the desired product.

The reaction may occur almost immediately or may require periods of up to several days depending upon the reactants and reaction conditions. In most instances, however, reaction is complete in less than four hours.

The products are yellow crystalline substances for the most part which precipitate from the reaction mixture. They are collected by suitable means and dried.

The starting 2-lower alkanoylquinoxaline-1,4-dioxides, many of which are new compounds, are prepared by known methods such as selenium dioxide oxidation of the corresponding alkyl derivatives; e.g., methyl is oxidized to formyl; ethyl to acetyl; propyl to propionyl, and butyl to butyryl, according to the procedure of Seyhan, Ber. 84,477 (1951). The method comprises, in general, oxidation of the desired 2-lower alkylquinoxaline-1,4-dioxide in a suitable solvent such as lower alkyl esters of acetic acid, especially ethyl acetate, aromatic hydrocarbons, such as toluene and the xylenes, at a temperature of from about 50° C. to the boiling point of the solvent. The selenium dioxide and lower alkylquinoxaline-1,4-dioxide are used in approximately equal quantities by weight. The oxidation is conducted for periods of from about one hour to about three hours after which the product is recovered by suitable means. The requisite 2-lower alkylquinoxaline-1,4-dioxides are prepared by condensation of the appropriate 1,2-dicarbonyl compound, or the monoxime or bisulfite addition compound thereof, with o-phenylene diamine in a suitable solvent. Water, alcohols. acetic acid and dioxane serve as solvents for the condensation which is conducted at temperatures of from about 0° to the boiling point of the solvent.

Certain 2,3-di-lower alkylquinoxaline-1,4-dioxides, for example, 2,3-dimethyl- and 2,3-dipropyl-, can be prepared by reaction of a 2,3-dichloroquinoxaline with the desired alkyl magnesium iodide in a 1–2 molar ratio (Ogg et al., J. Am. Chem. Soc., 53, 1846 (1931)). Alternatively, 2,3-dipropylquinoxaline is prepared by reaction of the dipotassium salt of the corresponding 2,3-dimethyl compound with ethyl iodide (Ogg et al., loc. cit.). The quinoxalines thus obtained are then oxidized by means of per acids such as hydrogen peroxide in glacial acetic acid, peracetic acid, m-chloroperbenzoic acid, performic acid, or monoperphthalic acid to the corresponding 1,4-dioxides.

In the case of 2,3-di-(lower alkyl)quinoxaline-1,4-dioxides wherein the alkyl groups are different, selenium dioxide oxidation produces a mixture of products. The oxidation products can be separated by known methods such as chromatography or fractional crystallization. An alternative method which produces only the desired 2-lower alkanoylquinoxaline-1,4-dioxide comprises a Grignard reaction on the appropriate 2-formyl-3-lower alkylquinoxaline with $R_1MgX(X=Br.I)$ to give upon hydrolysis the corresponding 2-($\alpha$-hydroxy lower alkyl)-3-lower alkylquinoxaline. The thus produced compound is oxidized by means of a peracid such as those enumerated above to the corresponding 2-($\alpha$-hydroxy lower alkyl)-3-lower alkylquinoxaline-1,4-dioxide. Oxidation of the secondary alcohol group by chromic oxide, potassium dichromate or potassium permanganate produces the desired 2-lower alkanoyl-3-lower alkylquinoxaline-1,4-dioxide.

A further method comprises the conversion of a 2-($\alpha$-bromo lower alkyl)quinoxaline to the corresponding 2-lower alkanoyl derivative by reaction with dimethyl sulfoxide at a temperature of about 20° C. to about 50° C. The reaction mixture is then poured into water, the alkanoyl derivative extracted with chloroform and recovered therefrom. Per acid oxidation of the product affords the desired 2-lower alkanoyl quinoxaline-1,4-dioxide.

In still another method, a Boekelheide type rearrangement is employed. This method comprises conversion of a 2-lower alkyl or 2,3-di-lower alkyl quinoxaline to the mono-N-oxide followed by treatment of the N-oxide with acetic anhydride to produce the corresponding 2-($\alpha$-acetoxy lower alkyl) compound. Oxidation by means of a per acid followed by acid hydrolysis gives the desired 2-($\alpha$-hydroxy lower alkyl)quinoxaline-1,4-dioxide which is then oxidized to the $\alpha$-lower alkanoyl derivative as described above.

The novel compounds of this invention exhibit activity as urinary tract and systemic anti-infectives in animals, including man, against a wide variety of microorganisms including gram-positive and gram-negative bacteria. They are especially valuable against gram-negative infections both in vitro and in vivo. Their surprising activity can be demonstrated by in vitro tests against various organisms in a brain-heart infusion medium by the usual two-fold serial dilution technique.

The in vivo activity of the compounds of this invention can be demonstrated by two procedures. The first procedure is the urinary excretion test which is an acute test conducted on healthy animals. This test entails giving the test animals a single massive dose of the test compound. Then, after a given time interval, the urine of the animal is collected and assayed for antibacterial activity by an in vitro procedure, for example, the growth inhibition of *E. coli*, *P. vulgaris* and *P. aeruginosa* is measured. The other in vivo procedure employed is the urinary tract infection test which is a chronic test conducted on sick animals. Here, a surgical incision is made into the bladder of the experimental animal and a dose of an infectious organism plus a pellet of zinc about 2 mm. in diameter are inserted into the bladder. The zinc pellet acts as a focus of the infection and over a period of 2 weeks, infection in control animals normally becomes quite serious. During this period of time, however, the test animal is allowed to imbibe ad libitum on a feed which contains incorporated therein a compound of this invention at a predetermined concentration, such as 0.2%. At the end of this period, the control and test animals are sacrificed and the kidney and bladder are examined to determine the extent of the infection. The urine of said animals is also examined to determine the bacterial count. The compounds of this invention are found to be surprisingly effective in suppressing kidney and bladder infections and in controlling the bacterial count of the urine.

As previously mentioned these novel compounds are also effective in the control of chronic respiratory disease of poultry, especially of chickens, and of infectious sinusitis in turkeys. The primary causative organisms responsible for these respiratory infections belong to the genus Mycoplasma, especially *M. gallisepticum*, *M. gallinarum*, *M. iners*, *M. synovaei*, and type N—PPLO. The field condition commonly known as "air sac" disease, airsacculitis of complicated respiratory disease is not due to Mycoplasma alone but to concomitant secondary infections, especially to coliform, Proteus and *Micrococcus* species. The term "chronic respiratory disease" as used in this application also includes complicated chronic respiratory disease and infectious sinusitis.

It should be noted that these valuable compounds are effective for the control, that is the treatment and prevention, e.g., prophylaxis, of the herein described infections. For such purposes many modes of administration of the novel compounds of this invention are possible including the oral and parenteral routes of administration, the method of choice being dictated by the type and severity of the infection. These compounds may be administered alone or, preferably, in combination with a pharmaceutical carrier and, as such, can be given in single or multiple doses. More particularly, they may be administered in suitable dosage forms to provide a dosage unit of active ingredients in an amount that is adjusted to the particular needs of the individual. When large doses of these compounds are to used, it is preferable to administer two or more doses at various time intervals.

When used for such purposes these novel compounds can be administered orally or parenterally, e.g. by subcutaneous or intramuscular injection, at a dosage of from about 1 mg./kg. to about 100 mg./kg. of body weight. For parenteral administration dosages of from about 10 mg./kg. to about 100 mg./kg. of body weight are preferred. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. For oral administration dosages of from about 1 mg./kg. to about 60 mg./kg. of body weight are favored. This can be achieved by a number of methods including dosage unit formulations such as capsules, tablets, lozenges, troches, liquid mixtures and solutions. In the case of poultry and domestic animals other methods include mixing with the feed, the preparation of feed concentrates and supplements. Additionally, dilute solutions or suspensions, e.g., a 0.1% solution, can be supplied for drinking purposes.

Further, these compounds may be combined with feeds or with various pharmaceutically acceptable inert carriers in the form of capsules, tablets, lozenges, troches, dry mixes, suspensions, solutions, elixirs, and parenteral solutions or suspensions. The carriers employed include solid diluents, aqueous vehicles, nontoxic organic solvents and the like. In general, the compounds of this invention are present in various dosage forms at concentration levels ranging from about 0.5% to about 90% by weight of the total composition.

For purposes of oral administration, tablets containing various excipients such as citric acid, sucrose, starch and lactose may be employed along with various disintegrants such as alginic acid and certain complex silicates together with binding agents such as polyvinylpyrrolidone, gelatin and acacia. In addition, lubricating agents such as magnesium stearate, sodium metaphosphate and talc are often very useful for tabletting purposes. Solid compositions of a similar type may also be employed as fillers in soft elastic and hard shelled gelatin capsules. Preferred materials in this connection would also include polyethylene glycol and glycerin as they not only may be used in this particular type of pharmaceutical dosage form as diluents but also as plasticizing agents serving to protect the capsule against any leakage that might possibly occur due to denaturing of the gelatin protein. When aqueous suspensions and elixirs are desired for oral administration, the compounds of this invention may be combined with various sweetening and flavoring agents, coloring matter or dyes, and if so desired, emulsifying and suspending agents together with such diluents as water, ethyl alcohol, propylene glycol, glycerin and various combinations thereof. For the control of chronic respiratory disease it is convenient to provide the active ingredient admixed with a nutritionally balanced feed or a food concentrate.

Solutions or suspensions of these valuable compounds in pyrogen-free sterile distilled water containing a preservative such as butylparaben, chlorobutanol, phenol and the like, may be utilized for parenteral administration by the subcutaneous, intramuscular or intravenous route of injection.

Further, the addition of a low level of one or more of the herein described Shiff bases to the diet of animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals and other factors known to be required for the maximum healthy growth of such animals. The animals thus attain market size sooner and on less feed.

The herein described feed compositions have been found to be particularly valuable and outstanding in the case of such animals as poultry, rats, hogs, swine, lambs, cattle, and the like. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

The resulting new feed compositions have marked effects on the rate of growth and feed efficiency. Feed efficiency, an extremely important economic factor in raising animals, may be defined as the number of pounds of feed required to produce a pound gain in weight. The novel feed supplements of this invention permit the use of higher energy, higher protein diets to obtain improved feed/gain ratios and the use of feedstuffs that at present are not utilized efficiently. Simply stated, the compositions of this invention when fed to animals are more efficiently converted to animal body weight than prior art compositions. Any animal feed composition may be prepared to comprise the usual nutritional balance of energy, proteins, minerals, and vitamins together with one or more of the quinoxaline-di-N-oxides described above. Some of the various components are commonly grains such as ground grain, and grain by-products; animal protein substances, such as meat, and fish by-products; vitaminaceous mixtures, e.g. vitamin A and D mixtures, riboflavin supplements and other vitamin B complexes; and bone meal, limestone, and other inorganic compounds to provide minerals.

The relative proportions of the quinoxaline-di-N-oxides in feeds and feed concentrates may vary somewhat, depending upon the compound, the feed with which they are employed and the animal consuming the same. These substances are advantageously combined in such relative proportions with edible carriers to provide concentrates which may readily be blended with standard nutritionally balanced feeds or which may be used themselves as an adjunct to the normal feedings.

Dry pre-mixes containing these compounds are prepared containing from 0.10 to about 10% of the active ingredient mixed with salt (sodium chloride) and other minerals which it is desired to incorporate into the poultry ration. This can then be fed on an ad libitum basis by adjusting the proportion of active ingredient in the mixture to the average daily consumption per bird so as to provide the proper daily dose as specified above. If prepared feed supplements are employed, the material can be administered in admixture with the feed. Again a concentration range of about 0.10 to 10% of the drug in the feed is employed. However, higher proportions can be satisfactorily employed depending upon the palatability of the product to the poultry. This can be readily determined by simple experimentation. It is sometimes convenient to mix the daily dose with only a portion of the average daily allotment to insure complete consumption of the dose. The balance of the daily feed supplement can then be fed after consumption of the medicated portion in the usual fashion. These methods are particularly useful for prophylactic treatment, but similar compositions can be employed for therapeutic use. Concentrations of drug in the feed or mineral mixture up to from 0.1 to 10%, depending again upon the palatability of the material, are sometimes useful.

In the preparation of concentrates a wide variety of carriers may be employed containing the aforesaid drugs. Suitable carriers include the following: soybean oil meal, corn gluten meal, cotton seed oil meal, sunflower seed meal, linseed oil meal, cornmeal, limestone and corncob meal. The carrier facilitates uniform distribution of the active materials in the finished feed with which the concentrate is blended. This is especially important because only a small proportion of these potent materials are required. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e. premixes, suitable for blending by feed manufacturers to produce finished feeds or concentrates of lower potency, the drug content may range from about 0.1 g. to 50 g. per pound of concentrate. A particularly useful concentrate is provided by blending 2 g. of drug with 1 pound of limestone or 1 pound of limestone-soybean oil meal (1:1). Other dietary supplements, such as vitamins, minerals, etc. may be added to the concentrates in the appropriate circumstances.

The high potency concentrates may be blended by the feed manufacturer with proteinaceous carriers, such as soybean oil meal, to produce concentrated supplements which are suitable for direct feeding to animals. In such instances the animals are permitted to consume the usual diet of corn, barley and other fibrous grains and the like.

The proportion of the drug in these supplements may vary from about 0.1 to 10 g. per pound of supplement.

The concentrates described may also be added to animal feeds to produce a nutritionally balanced, finished feed containing from about 10 to about 125 g. of the quinoxaline-di-N-oxide per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran, and dried molasses. Bone meal, limestone, iodized salt and trace minerals are frequently added to supply the necessary minerals, and urea to provide additional nitrogen.

As is well known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80% of grains, 3 to 10% animal protein, 5 to 30% vegetable protein, 2 to 4% of minerals, together with supplementary vitaminaceous sources.

Additionally, many of the compounds described herein have unexpectedly significant activity in vivo against a variety of small and medium viruses such as the myxoviruses and especially against influenza PR8 and BGL. Care should, of course, be exercised when using these compounds for this purpose. Therapeutic dosages and regimens commensurate with the therapeutic index of these compounds can be administered without substantial adverse effect.

Furthermore, many of these compounds are highly active anthelmintic agents by the oral and parenteral routes of administration and compare with piperazine sulfate in their activity and dosage regimen.

In all these various formulations the active agents can be one or a plurality of the compounds of this invention. These compounds may also be advantageously employed in combination with other pharmaceutically acceptable compounds such as the tetracycline-type antibiotics, carbomycin, neomycin, bacitracin, tylosin, sulfomethazine and penicillin-type antibiotics. In this manner it is possible to obtain mixtures which will combat disease and produce an over-all well being in the patient.

The $PD_{50}$ values (the dosage which will bring about 50% survival of the test animals) of representative compounds within the scope of this invention against a systemic gram-negative infection in mice and the minimum effective dose necessary to cure a Proteus urinary tract infection (UTI) in rats are tabulated below and compared with Furadantin.

(1) [2-formyl-3-methylquinoxaline-1,4-dioxide]-N-[3-(2-oxazolidonyl)oxime]
(2) 2-formyl-3-methylquinoxaline-1,4-dioxide semithiocarbazone
(3) 2-formyl-3-methylquinoxaline-1,4-dioxide carbomethoxyhydrazone
(4) 2-formyl-3-methylquinoxaline-1,4-dioxide oxime
(5) 2-formyl-3-methylquinoxaline-1,4-dioxide acetylhydrazone
(6) 2-formyl-3-methylquinoxaline-1,4-dioxide-N-methylhydrazone
(7) 2-formylquinoxaline-1,4-dioxide semicarbazone
(8) 2-formylquinoxaline-1,4-dioxide oxime
(9) [2-formylquinoxaline-1,4-dioxide]-N-[3-(2-oxazolidonyl)oxime]
(10) 2-formyl-3-methylquinoxaline-1,4-dioxide carbethoxyhydrazone
(11) 2-formylquinoxaline-1,4-dioxide carbethoxyhydrazone
(12) N-(5-nitro-2-furfurylidene)-1-aminohydantoin (Furadantin)

| Compound | $PD_{50}$ (mg./kg.) Pasteurella | | Minimum Effective Dose (mg./kg.) |
|---|---|---|---|
| | Oral | SQ [1] | UTI [2] |
| 1 | 28 | 16 | 25 |
| 2 | 400 | 55 | 12.5 |
| 3 | 8.3 | 9.4 | 25 |
| 4 | 21 | 24 | 6.25 |
| 5 | 42 | 44 | 25 |
| 6 | 85 | 50 | 25 |
| 7 | 23 | 35 | 1.56–3.12 |
| 8 | 60 | 100 | >25 |
| 9 | 13 | 13 | 1.56 |
| 10 | 35 | 35 | 12.5 |
| 11 | 110 | 150 | <12.5 |
| 12 | | | 25–50 |

[1] SQ=Subcutaneous injection.
[2] Infecting organism is Proteus 59.

The following examples are solely for the purpose of illustration only and are not to be construed as limitations of this invention, many variations of which are possible without departing from the spirit or scope thereof.

EXAMPLE I

*2-formylquinoxaline-1,4-dioxide carbomethoxyhydrazone*

A solution of methylcarbazate (48.0 g.) in methanol (250 ml.) is added all at once at room temperature to a well stirred solution of 2-formylquinoxaline-1,4-dioxide (100 g.) in methanol (2.5 liters). Two drops of concentrated hydrochloric acid are added. The mixture is stirred for 3 hours then filtered to remove the yellow crystalline product. The crystals are washed with methanol then air dried; M.P. 234.5–236° C. (dec.). Yield=121.8 g.

The product is purified by refluxing in chloroform for 2 hours, followed by filtration and air drying; M.P. 239.5–240° C. (dec.).

*Analysis.*—Calcd. for $C_{11}H_{10}O_4N_4$: C, 50.38; H, 3.84; N, 21.37%. Found: C, 50.36; H, 3.91; N, 21.17%.

The ultraviolet absorption spectrum (water) exhibits maxima at 236, 251, 303, 366 and 373 m$\mu$ with extinction coefficients, of 11,000, 10,900, 36,400, 16,100 and 16,200, respectively. The infrared spectrum shows characteristic ester absorption at 5.67$\mu$.

EXAMPLE II

*2-formyl-3-methylquinoxaline-1,4-dioxide semicarbazone*

To a solution of 2-formyl - 3 - methylquinoxaline - 1,4-dioxide (100 g.) in methanol (3 liters) there is added a warm solution (40–50° C.) of semicarbazide hydrochloride (55 g.) in methanol (3 liters). The mixture is stirred for 3 hours at the end of which time the yellow crystalline product is separated by filtration, washed with hot methanol and air dried; M.P. 240–241° C. (dec.). Yield=70 g.

*Analysis.*—Calcd. for $C_{11}H_{11}O_3N_5$: C, 50.57; H, 4.24; N, 26.81%. Found: C, 50.59; H, 4.28; N, 26.50%.

EXAMPLE III

The following Schiff bases are prepared by the procedures of the preceding examples. Pertinent data on the products are tabulated below.

TABLE I.—ANALYSES

| R₁ | R₂ | R₃ | Percent C Calcd. | Percent C Found | Percent H Calcd. | Percent H Found | Percent N Calcd. | Percent N Found | M.P. (° C.) | U.V. (mμ.) λ max. | U.V. (mμ.) ε | I.R. (μ) |
|---|---|---|---|---|---|---|---|---|---|---|---|---|
| H | CH₃ | —NHCOOH₃ | 52.17 | 52.42 | 4.38 | 4.31 | 20.28 | 20.56 | ¹ 245–7 | 241 | ² 10,750 | 5.70 |
| H | CH₃ | —NHCOOCH(CH₃)CH₂OH | 52.49 | 52.39 | 5.04 | 4.87 | 17.49 | 17.66 | ¹ 214–5 | 243 364 240 362 375 241 | 32,000 15,700 15,850 29,000 10,600 18,350 | 5.80 |
| H | CH₃ | —OH | 54.79 | 54.84 | 4.14 | 4.25 | 19.17 | 19.07 | ¹ 213–4 | 283 373 241 | 29,200 10,190 ² 19,500 | |
| H | CH₃ | —NH—COCH₃ | 55.38 | 55.41 | 4.65 | 4.62 | 21.53 | 21.56 | ¹ 240–2 | 295 364 236 305 | 29,300 15,500 16,100 19,400 | 5.97 |
| H | CH₃ | —NHCH₃ | 56.89 | 56.77 | 5.21 | 5.50 | 24.13 | 24.09 | ¹ 174.5–5.5 | 337 386 236 253 | 27,200 14,700 12,800 11,200 | |
| H | H | —HCOCH₃ | 53.66 | 53.68 | 4.09 | 4.02 | 22.76 | 22.75 | ¹ 252–3 | 305 373 248 | 38,800 17,500 ~17,600 | 5.95 |
| H | H | —OH | 52.68 | 52.78 | 3.44 | 3.46 | 20.48 | 20.31 | ¹ 236–8 | 293 378 240 | 31,100 11,800 14,300 | |
| H | H | 3-(2-oxazolidonyl) | 52.55 | 52.88 | 3.68 | 3.85 | 20.43 | 20.90 | ¹ 253–5 | 310 386 244 | 39,000 13,200 13,800 | 5.71 |
| H | H | —NH—COOCH(CH₃)CH₂OH | 50.98 | 51.03 | 4.61 | 4.65 | 18.29 | 18.18 | ¹ 249–50 | 308 379 240 | 38,000 13,800 ² 19,000 | 5.81 |
| H | CH₃ | —NHCOOC₂H₅ | 53.79 | 53.81 | 4.86 | 4.67 | 19.30 | 19.35 | ¹ 236–7 | 292 364 254 | 40,000 15,000 ² 13,200 | 5.74 |
| H | H | —NHCOOC₂H₅ | 52.17 | 52.07 | 4.38 | 4.23 | 20.28 | 20.35 | ¹ 245–6 | 305 370 | 37,400 18,700 | 5.70 |

¹ Dec.
² U.V. data obtained in water as solvent; the remaining data is determined in methanol solution.

EXAMPLE IV

Following the procedures of Examples I and II, products having the formula shown are prepared.

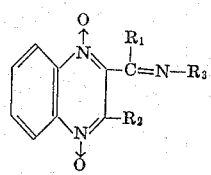

| R₁ | R₂ | R₃ | R₁ | R₂ | R₃ |
|---|---|---|---|---|---|
| CH₃ | H | NHCOOCH₃ | i-C₃H₇ | H | OH |
| H | H | NHCOOC₄H₉ | H | n-C₃H₇ | OH |
| H | H | NHCOOC₆H₁₃ | C₂H₅ | C₂H₅ | OH |
| C₂H₅ | C₂H₅ | NHCOOC₂H₅ | CH₃ | CH₃ | CH₃ |
| n-C₄H₉ | H | NHCOOCH₃ | H | H | C₄H₉ |
| C₆H₁₃ | CH₃ | NHCOOC₂H₅ | CH₃ | CH₃ | C₆H₁₃ |
| CH₃ | n-C₄H₉ | NHCOOCH₃ | CH₃ | CH₃ | NHCONH₂ |
| H | C₂H₅ | NHCOO-t-C₄H₉ | n-C₆H₁₃ | H | NHCONH₂ |
| CH₃ | n-C₆H₁₃ | NHCOOCH₃ | C₂H₅ | C₂H₅ | NHCONH₂ |
| CH₃ | H | NHCH₃ | H | n-C₄H₉ | NHCONH₂ |
| i-C₃H₇ | H | NHCH₃ | CH₃ | CH₃ | NHCSNH₂ |
| H | CH₃ | NHC₆H₅ | n-C₆H₁₃ | H | NHCSNH₂ |
| H | CH₃ | NHC₇H₇ | CH₃ | CH₃ | NHC(NH)NH₂ |
| n-C₅H₁₁ | H | NHCH₂CH₂OH | n-C₄H₉ | H | NHC(NH)NH₂ |
| CH₃ | n-C₆H₁₃ | NH-i-C₃H₉ | CH₃ | CH₃ | 3-(2-oxazolidonyl) |
| H | H | NHCH₃ | n-C₄H₉ | H | 3-(2-oxazolidonyl) |
| H | H | NHC₆H₁₃ | CH₃ | n-C₆H₁₃ | 3-(2-oxazolidonyl) |
| CH₃ | H | NH(CH₂)₄OH | C₂H₅ | C₂H₅ | NHCOOCH₃ |
| CH₃ | H | OH | n-C₃H₇ | n-C₄H₉ | NHCOOCH₃ |
| CH₃ | H | OCH₃ | CH₃ | C₂H₅ | OH |
| H | CH₃ | OCH₃ | C₂H₅ | n-C₃H₇ | OH |
| i-C₃H₇ | H | OCH₃ | | | |
| H | n-C₃H₇ | O-i-C₃H₇ | | | |
| C₂H₅ | C₂H₅ | OC₂H₅ | | | |
| CH₃ | CH₃ | OC₂H₅ | | | |
| CH₃ | CH₃ | NHCOOCH₂CH₂OH | | | |
| C₄H₉ | H | NHCOO(CH₂)₃OH | | | |
| C₄H₉ | C₄H₉ | NHCOOCH₂CH₂OH | | | |
| CH₃ | H | 1-[4-(β-hydroxyethyl)piperazine] | | | |
| CH₃ | CH₃ | 1-[4-(β-hydroxyethyl)piperazine] | | | |
| H | H | 1-[4-(β-hydroxyethyl)piperazine] | | | |
| C₄H₉ | H | 1-[4-(β-hydroxyethyl)piperazine] | | | |
| H | C₆H₁₃ | 1-[4-(β-hydroxyethyl)piperazine] | | | |

EXAMPLE V

*Preparation of 2-lower alkanoylquinoxaline-1,4-dioxides*

Method A—*Selenium dioxide oxidation of alkyl to alkanoyl groups.* — 2,3-dimethylquinoxaline 1,4-dioxide (20 gm.) is dissolved in ethyl acetate (250 ml.), selenium dioxide (15 gm.) added, and the mixture refluxed and stirred for 90 minutes. The ethyl acetate is removed by vacuum distillation and the residue triturated with methylene chloride. Concentration of the methylene chloride solution yields crude 2-formyl-3-methylquinoxaline-1,4-dioxide (Circa 15 g.). Recrystallization from ethyl acetate/methylene chloride mixture yields the pure product; M.P. 186–187° C. (decomp.).

*Analysis.*—Calculated for C₁₀H₈O₃N₂: C, 58.82; H, 3.95; N, 13.72. Found: C, 58.77; H, 3.93; N, 13.78.

In like manner the following 2-lower alkanoyl-1,4- dioxides are produced from the appropriate 2-lower alkyl-quinoxaline-1,4-dioxides.

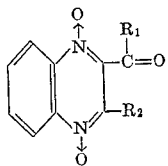

| R₁ | R₂ | R₁ | R₂ |
|---|---|---|---|
| CH₃ | H | i-C₃H₇ | H |
| C₂H₅ | C₂H₅ | n-C₅H₁₁ | H |
| n-C₄H₉ | H | CH₃ | n-C₆H₁₃ |
| n-C₆H₁₃ | CH₃ | H | n-C₃H₇ |
| CH₃ | n-C₄H₉ | CH₃ | CH₃ |
| H | C₂H₅ | n-C₆H₁₃ | H |
| H | C₆H₁₃ | H | n-C₄H₉ |

*Method B—Oxidation of 2-(α-hydroxy lower alkyl) quinoxaline-1,4-dioxides.* — A solution of 2-(α-hydroxyethyl)-3-ethylquinoxaline (8.7 g.) in 500 ml. benzene is mixed with a solution of chromium trioxide (4.0 g.) in 100 ml. water. The mixture is stirred vigorously for two hours, the benzene layer separated, washed twice with water and dried with anhydrous sodium sulfate. Removal of the solvent in vacuo provides the crude alkanoyl derivative which is then converted to the 1,4-dioxide by oxidation with m-chlorperbenzoic acid as described in Example VI, Method A, The remaining products of Example V are similarly converted to their respective 2-lower alkanoyl-1,4-dioxides.

*Method C—2-(α-bromo lower alkyl)quinoxaline-1,4-dioxides.*—2-(α-bromoethyl)quinoxaline (10 g.) is dissolved in dry dimethyl sulfoxide (200 ml.) and allowed to stand at room temperature for 48 hours. The mixture is then poured into an excess of water and the product extracted therefrom with chloroform. The chloroform extract is back-washed with water, dried over anhydrous sodium sulfate and evaporated in vacuo to give 2-acetyl-quinoxaline.

Oxidation of the product with m-chloroperbenzoic acid as described in Example IV, Method B gives 2-acetyl-quinoxaline-1,4-dioxide.

The 2-(α-bromoethyl)quinoxaline is prepared by adding to a solution of 2-ethylquinoxaline (15.8 g.) in acetic acid (100 ml.) a solution of bromine (16 g.) in acetic acid (100 ml.) dropwise at room temperature during 6 hours. The reaction mixture is then poured into excess water and the product extracted with chloroform. The chloroform extract is backwashed with water, dried (Na₂SO₄) and evaporated in vacuo to give the bromo component.

In like manner the following 2-lower alkanoylquinoxaline-1,4-dioxides are prepared from the appropriate 2-lower alkyl quinoxaline:

2-propionyl-
2-butyryl-
2-valeryl-
2-caproylquinoxaline-1,4-dioxide

EXAMPLE VI

*2-(α-hydroxy lower alkyl)quinoxaline-1,4-dioxides*

*Method A.*—2-formyl-3-(lower alkyl)quinoxaline (0.5 mole) (a product obtained from the selenium dioxide oxidation of 2-methyl-3-lower alkyl quinoxaline) in diethyl ether is treated with a solution of lower alkyl magnesium bromide (1 mole) in diethylether. After stirring for 1 hour at room temperature the mixture is treated with a saturated solution of ammonium chloride. The product, 2-(α-hydroxy lower alkyl)-3-(lower alkyl)quinoxaline, isolated by removal of the solvent, is crystallized from chloroform/hexane.

2-(α-hydroxy lower alkyl)-3-(lower alkyl)quinoxaline (0.25 mole) in chloroform is treated with m-chloroperbenzoic acid (0.5 mole) and the mixture allowed to stand at room temperature for 3 days. The precipitated m-chlorobenzoic acid is filtered off and the chloroform solution washed with saturated sodium bicarbonate solution. The product, 2-(α-hydroxy lower alkyl-3-lower alkyl) quinoxaline-di-1,4-dioxide, obtained by removal of the chloroform, is crystallized from acetone.

By means of this procedure the following compounds having the formula shown are prepared from the appropriate reactants.

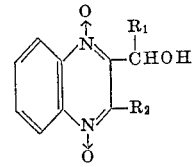

| R₁ | R₂ | R₁ | R₂ |
|---|---|---|---|
| C₂H₅ | C₂H₅ | CH₃ | n-C₆H₁₃ |
| n-C₄H₉ | CH₃ | CH₃ | CH₃ |
| n-C₆H₁₃ | CH₃ | n-C₄H₉ | n-C₄H₉ |
| CH₃ | n-C₄H₉ | | |

*Method B.*—2-3-di-lower alkylquinoxaline (1 mole) in chloroform is treated with m-chloroperbenzoic acid (1 mole) for 3 days at room temperature. The precipitated m-chlorobenzoic acid is filtered off and the chloroform solution washed with saturated sodium bicarbonate solution. The chloroform solution is dried (Na₂SO₄) and concentrated under vacuum. The product, 2,3-di-lower alkyl-quinoxaline mono-N-oxide, crystallizes from chloroform/hexane.

2-3-di-lower alkylquinoxaline mono-N-oxide (0.5 mole) in excess acetic anhydride is refluxed for 30 minutes and then the acetic anhydride removed in vacuo. The solid residue is purified by recrystallization from ether/hexane to give pure 2-(α-acetoxy lower alkyl)-3-lower alkylquinoxaline.

2-(α-acetoxy lower alkyl)-3-lower alkylquinoxaline (0.25 mole) in chloroform is treated with m-chloroperbenzoic acid (0.5 mole) as described in Method A to give 2-(α-acetoxy lower alkyl)-3-lower alkylquinoxaline-1,4-dioxide as yellow crystals from chloroform/hexane.

2-(α-acetoxy lower alkyl)-3-lower alkylquinoxaline-1,4-dioxide (0.2 mole) is allowed to stand in a mixture of methanol (3 liters) and 20% H₂SO₄ (500 ml.) for 8 days. The product, 2-(α-hydroxy lower alkyl)-3-lower alkylquinoxaline-1,4-dioxide, which deposits as yellow needles, is separated and purified by recrystallization from chloroform/hexane.

The following compounds having the above formula are thus prepared.

| R₁ | R₂ |
|---|---|
| CH₃ | C₂H₅ |
| n-C₃H₇ | n-C₄H₉ |
| C₂H₅ | n-C₃H₇ |

EXAMPLE VII

*2-formylquinoxaline-1,4-dioxide carbo-(β-chlorethoxy)hydrazone*

2-formylquinoxaline (1 mole) obtained by the selenium dioxide oxidation of 2-methylquinoxaline by a method similar to that described above, for the preparation of 2-formylquinoxaline-1,4-dioxide, in methanol (2 l.) is treated with β-hydroxyethylcarbazate (1 mole) and 2 drops of concentrated hydrochloric acid. The mixture is stirred overnight, the methanol removed under vacuum to give the product, 2-formylquinoxaline carbo-(β-hydroxyethoxy)hydrazone, as a solid residue.

The thus produced carbo-(β-hydroxyethoxy)hydrazone

| Quinoxaline-di-N-Oxide | Supplementation, g./ton | Percent Above or Below Controls | | | Birds |
|---|---|---|---|---|---|
| | | Weight | Feed Efficiency | Feed Consumption | |
| 2-formyl-3-methyl-carboethoxyhydrazone | 125 | +4.2 | +2.6 | +2.0 | Chicks. |
| 2-formyl-3-methyl-methylhydrazone | 20 | +1.0 | +1.3 | −2.2 | Do. |
| | 125 | +3.3 | +4.1 | +0.5 | Do. |
| 2-formyl-carbo-methoxyhydrazone | 20 | −1.2 | +1.1 | −2.2 | Do. |
| | 20 | +3.3 | +1.9 | | Do. |
| | 20 | +12.2 | +7.1 | | Poults. |
| | 10 | +2.3 | +1.9 | | Chicks. |
| | 10 | +11.6 | +6.4 | | Poults. |

(0.5 mole) and thionyl chloride (freshly distilled) (0.6 mole) in tetrahydrofuran (1 l.) is stirred at room temperature for 48 hours. The product, 2-formylquinoxaline carbo-(β-chloroethoxy)hydrazone, is obtained by pouring the entire reaction mixture into excess water and extracting the product with chloroform. The chloroform solution is washed with a saturated solution of sodium bicarbonate, dried over anhydrous sodium sulfate and evaporated to dryness in vacuo. The product is converted to the 1,4-dioxide title compound by oxidation in chloroform with two molecular equivalents of m-chlorobenzoic acid using the method described above in Example VI.

EXAMPLE VIII

*2-formylquinoxaline-1,4-dioxide carbo-(β-chlorethoxy)hydrazone*

2-formylquinoxaline-1,4-dioxide carbo-(β-hydroxyethoxy)hydrazone (prepared as in Example IV) (0.1 mole) in tetrahydrofuran (1 l.) and thionyl chloride (0.15 mole) are stirred at room temperature for 90 hours. The product, 2-formylquinoxaline-1,4-dioxide carbo-(β-chloroethoxy)hydrazone, is obtained by pouring the reaction mixture into 3 liters of water and extracting with chloroform. The chloroform solution is washed with saturated sodium bicarbonate solution, dried ($Na_2SO_4$) and the solvent removed under reduced pressure to give the solid product.

In like manner the following compounds are prepared from the appropriate 2-formylquinoxaline-1,4-dioxide carbo-(hydroxy lower alkoxy)hydrazones of Example IV:

2-acetyl-3-methylquinoxaline-1,4-dioxide carbo-(β-chloretoxy)hydrazone
2-valerylquinoxaline-1,4-dioxide carbo-(γ-chloropropoxy)hydrazone
2-valeryl-3-n-butylquinoxaline-1,4-dioxide carbo-(β-chlorethoxy)hydrazone

EXAMPLE IX

Substitution of thionyl bromide for thionyl chloride in the procedure of Example VIII produces the corresponding bromo compounds.

EXAMPLE X

The efficacy of several of the herein described quinoxaline-di-N-oxides in improving broiler chick and turkey poult performance is summarized in the following table. Supplementation of the rations with said compounds at various levels brought about economically significant gains in growth and feed efficiency.

The experimental birds and dietary treatments are assigned pens in accordance to randomized block designs. Each observation reported is an average of 6 pen replications, each pen containing 10 birds. The experiments are conducted in battery brooders for from 1 to 28 days of bird age. Controls are run using, of course, unsupplemented rations. For convenience in reporting results the percent change in the weight, feed efficiency and feed consumption over the corresponding values for the controls are reported. In each case, the control is assigned a value of 100%. An increase in performance for a given compound is then represented by a + value; e.g. +6.3% weight gain indicates an increase in weight amounting to 106.3% relative to 100% for the controls.

EXAMPLE XI

In further tests the compounds of Example X are added to the standard balanced animal feed compositions normally given sheep, steer, goats, dogs and mink at levels of from 10, 20, 50, 100 and 125 g./ton of feed. Each species is observed to undergo accelerated growth, particularly at the lower levels of supplement used.

EXAMPLE XII

In this experiment 48 four-week-old early weaned pigs, 4 castrated males and 4 females, are divided into 6 equal groups and each group assigned to a pen. Three of the groups serve as controls and are fed only a standard, pre-starter, non-supplemented ration until an average line weight of 25 lbs. is attained. At this point the pigs are placed on a standard starter ration for the duration of the trial which is terminated at an average live weight of 50 lbs. The remaining three groups are fed the same standard, pre-starter and starter ration supplemented with 2-formylquinoxaline-1,4-dioxide carbo-methoxyhydrazone at 20 g./ton according to the same schedule.

The total amount of the basal ration to be fed to each treatment group and to each pen is listed below. Each pen is to receive the entire amount of the pre-starter so that the weigh back at the end of the trial will be starter ration.

| Ration Fed | Percent Crude Protein | Approximate Weight Range | Amount of Ration (lbs.) | |
|---|---|---|---|---|
| | | | Per Treatment | Per Pen |
| Pre-starter | 20 | 10 to 25 lbs | 750 | 250 |
| Starter | 18 | 25 to 50 lbs | 1,500 | 500 |

The supplement is added to the appropriate rations replacing corn to give the desired level of drug.

The basal ration formulations are as follows:

| Ingredients | Pre-Starter 750 lb. Mix (lbs.) | Starter 1,500 lb. Mix (lbs.) |
|---|---|---|
| Ground Yellow Corn | 382.9 | 864.75 |
| Cane Sugar | 37.5 | |
| Soybean Meal (50% C.P.) [1] | 175.5 | 293.25 |
| Dried Skim Milk | 75.0 | 75.0 |
| Dried Whey | 37.5 | 150.0 |
| Dehydrated Alfalfa Meal (17% C.P.) [1] | | 37.5 |
| Stabilized Animal Fat | 18.75 | 37.5 |
| Limestone | 5.25 | 9.0 |
| Dicalcium Phosphate | 9.4 | 16.5 |
| Iodized Salt | 3.75 | 7.5 |
| Vitamin Premix [2] | 3.75 | 7.5 |
| Delamix [3] | 0.75 | 1.5 |
| | 759.00 | 1500.00 |

[1] C.P.=Crude Protein.

[2] Vitamin Premix:     Percent of Premix
    Vitamin A _____ 10
    Vitamin $D_3$ _____ 10
    Choline Chloride (25%) _____ 35.25
    Niacin _____ 0.55
    Calcium Pantothenate (45%) _____ 10
    Riboflavin _____ 0.39
    Vitamin $B_{12}$ _____ 0.2

[3] Delamix:
    Manganese _____ 12
    Iodine _____ 0.24
    Iron _____ 4.0
    Copper _____ 0.4
    Zinc _____ 4.0
    Cobalt _____ 0.04

An average increase of 12.2% in growth improvement and 5.7% in feed efficiency is observed in the three test groups over the three control groups.

Further such tests conducted with compounds of Example III provide similar improvement in growth and feed efficiency.

EXAMPLE XIII

The procedure of Example XII is repeated but using the following basal ration formulations and a combination of 2-formyl quinoxaline-1,4-dioxide carbomethoxyhydrazone (20 g./ton) and bacitracin (50 g./ton) as the drug in lieu of the formulations and drug of Example XII. The bacitracin is added as the resin adsorbate: 116 g. bacitracin/lb. adsorbate.

Basal Ration Formulation

| Ingredients | Pre-Starter 750 lb. Mix (lbs.) | Starter 1,500 lb. Mix (lbs.) |
|---|---|---|
| Ground Yellow Corn | 383.2 | 865.5 |
| Cane Sugsr | 37.5 | |
| Soybean Meal (50% C.P.) | 175.5 | 293.25 |
| Dried Skim Milk | 75.0 | 75.0 |
| Dried Whey | 37.5 | 150.0 |
| Dehydrated Alfalfa Meal (17% C. P.) | | 37.5 |
| Stabilized Animal Fat | 18.75 | 37.5 |
| Limestone | 5.25 | 9.0 |
| Dicalcium Phosphate | 9.4 | 16.5 |
| Iodized Salt | 3.75 | 7.5 |
| Vitamin Premix | 3.75 | 7.5 |
| Delamix | 0.37 | 0.75 |
| Zinc Carbonate | [1] 29.5 | [1] 59 |
| | 750.0 | 1500.0 |

[1] Grams.

A 25.5% average increase in growth response and an 8.1% average increase in feed efficiency is obtained.

Substitution of the compounds of Example III in place of 2-formylquinoxaline-1,4-dioxide carbomethoxyhydrazone produces similar significant responses.

EXAMPLE XIV

The efficacy of 2-formylquinoxaline-1,4-dioxide carbomethoxyhydrazone in promoting growth and improving the feed efficiency of broilers is illustrated below.

In this test, one group of 168 male and one group of 168 female one-day-old chicks of the Cobbs strain are each divided into 12 pens of 14 chicks per pen. One-half the pens of each sex serve as control and are fed a basal, non-supplemented diet. The other half is fed a basal diet supplemented with 20 g./ton of 2-formylquinoxaline-1,3-dioxide carbomethoxyhydrazone. The supplement is added to the basal diet at the expense of the corn meal.

At 13 days of age all chicks are individually weighed and the two lightest and the two heaviest birds removed from each pen. The remainder of the trial, through 29 days of age, is conducted with ten chicks per pen.

BASAL DIET

| Ingredient: | Percent of mix |
|---|---|
| Ground yellow corn | 52.15 |
| Soybean oil meal, 50% | 28.10 |
| Meat scraps, 50% | 4.00 |
| Fish solubles (100-S), 52% | 2.00 |
| Alfalfa meal, 17% | 2.00 |
| Stabilized animal fat | 8.00 |
| Multi-fos (dicalcium phosphate) | 2.00 |
| Limestone (38% Ca) | .25 |
| Iodized salt | .50 |
| Vitamin premix | .50 |
| Choline chloride, 25% | .30 |
| Vigofac 6 [1] | .15 |
| Delamix | .05 |

[1] Vigofac 6 is the registered trademark of Chas. Pfizer & Co., Inc., for unidentified poultry and livestock growth factors obtainable from Streptomyces fermentation sources.

The chicks on the supplemented diet are, on the average, 4.4% heavier than the chicks that received the control ration and demonstrated a 5.4% increase in feed efficiency over the controls.

A similar experiment conducted with poults but using 2-formylquinoxaline-1,4-dioxide carbomethoxyhydrazone at levels of 10 g. and 20 g./ton of basal diet demonstrated the following significant results.

| Supplement | Percent Above Controls | |
|---|---|---|
| | Weight | Feed Efficiency |
| 10 g./ton | +8.94 | +0.6 |
| 20 g./ton | +11.9 | +4.9 |

What is claimed is:
1. A compound of the formula

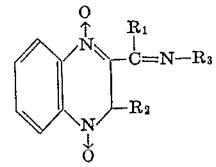

wherein each of $R_1$ and $R_2$ is individually selected from the group consisting of hydrogen and lower alkyl; $R_3$ is selected from the group consisting of

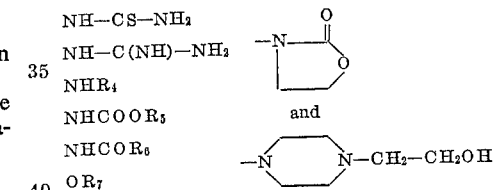

wherein $R_4$ is selected from the group consisting of lower alkyl, benzyl and hydroxyalkyl containing from 2 to 4 carbon atoms;

$R_5$ is selected from the group consisting of lower alkyl, hydroxyalkyl containing from 2 to 4 carbon atoms, and haloalkyl containing from 2 to 4 carbon atoms;

$R_6$ is selected from the group consisting of lower alkyl and phenyl; and $R_7$ is lower alkyl.

2. A compound of the formula:

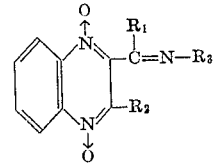

wherein $R_1$ and $R_2$ are each hydrogen and $R_3$ is —NHCOOR$_5$ wherein $R_5$ is lower alkyl.

3. A compound of the formula

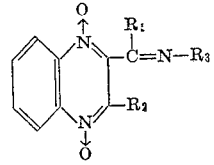

wherein $R_1$ is hydrogen, $R_3$ is NHCOOR$_5$ wherein $R_2$ and $R_5$ are each lower alkyl.

4. A compound of the formula

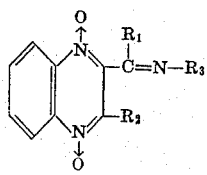

wherein R₁ is hydrogen, R₂ is lower alkyl and R₃ is

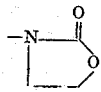

5. A compound of the formula

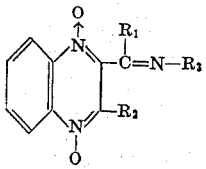

wherein R₁ is hydrogen, R₂ is lower alkyl and R₃ is NHCOOR₅ wherein R₅ is hydroxy alkyl containing from 2 to 4 carbon atoms.

6. A compound of the formula

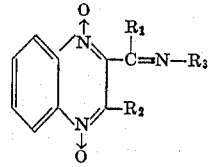

wherein R₁ and R₂ are each hydrogen and R₃ is NHCOOR₆ wherein R₆ is lower alkyl.

7. 2-formyl quinoxaline-1,4-dioxide carbomethoxyhydrazone.

8. 2-formyl-3-methylquinoxaline-1,4-dioxide carbo-(2-hydroxyisopropoxy)hydrazone.

9. 2-formyl-3-methylquinoxaline-1,4 - dioxide carbethoxyhydrazone.

10. [2-formyl-3-methylquinoxaline-1,4-dioxide] - N-[3-(2-oxazolidonyl)oxime].

11. 2-formyl-3-methylquinoxaline-1,4-dioxide acetylhydrazone.

References Cited

UNITED STATES PATENTS 2,974,167  3/1961  Stephens _____ 260—559

OTHER REFERENCES

Borsche et al., Annalen der Chemie, vol. 537, pp. 41 and 44–45 (1939).
Chemical Abstracts II, vol. 55, p. 1864S (1961).
Chemical Abstracts III, vol. 55, p. 18022 (1961).
Chemical Abstracts I, Sixth Collective Index, p. 10024S (1966).

JOHN D. RANDOLPH, *Primary Examiner.*

UNITED STATES PATENT OFFICE
CERTIFICATE OF CORRECTION

Patent No. 3,371,090　　　　　　　　　　　　　　February 27, 1968

James David Johnston

It is hereby certified that error appears in the above numbered patent requiring correction and that the said Letters Patent should read as corrected below.

Column 1, lines 51 and 52, the formula should appear as shown below instead of as in the patent.

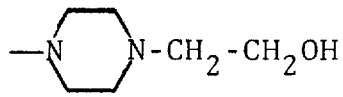

column 4, line 12, for "of" read -- or --; column 5, line 32, for "Shiff" read -- Schiff --; columns 9 and 10, TABLE 1, third column, line 6 thereof, for "-HCOCH$_3$" read -- -NHCOCH$_3$ --; same TABLE I, the last four columns entries opposite the first two compounds should appear as shown below instead of as in the patent:

| M.P. (°C.) | U.V. (mμ.) λ max. | ε | I.R. (μ) |
|---|---|---|---|
| 245-7 | 241 | 10,750* | 5.70 |
|  | 243 | 32,000 |  |
|  | 364 | 15,700 |  |
| 214-5 | 240 | 15,850 | 5.80 |
|  | 302 | 29,000 |  |
|  | 375 | 10,600 |  | column 11, line 44, for "IV" read -- VI --; column 12, line 7, for "alkyl-3-lower alkyl)" read -- alkyl)-3-(lower alkyl) --; column 18, line 11, for "NHCOOR$_6$" read -- NHCOR$_6$ --.

Signed and sealed this 24th day of June 1969.

(SEAL)
Attest:

EDWARD M. FLETCHER, JR.　　　　　　　　　　WILLIAM E. SCHUYLER, JR.
Attesting Officer　　　　　　　　　　　　　Commissioner of Patents